US010717183B1

(12) United States Patent
LaHood

(10) Patent No.: US 10,717,183 B1
(45) Date of Patent: Jul. 21, 2020

(54) LOCKING HUB AND EXTENSIBLE HANDLE ASSEMBLY

(71) Applicant: CLAM CORPORATION, Rogers, MN (US)

(72) Inventor: John Matthew LaHood, Waconia, MN (US)

(73) Assignee: Clam Corporation, Rogers, MN (US)

( * ) Notice: Subject to any disclaimer, the term of this patent is extended or adjusted under 35 U.S.C. 154(b) by 0 days.

(21) Appl. No.: 16/415,745

(22) Filed: May 17, 2019

(51) Int. Cl.
B25G 1/04 (2006.01)
F16B 7/10 (2006.01)
A01K 77/00 (2006.01)

(52) U.S. Cl.
CPC ............... B25G 1/04 (2013.01); F16B 7/105 (2013.01); A01K 77/00 (2013.01)

(58) Field of Classification Search
CPC .. A01K 77/00; A47L 9/32; B25G 1/04; B25G 3/02; B25G 3/12; B25G 3/18; B25G 3/04; B05C 17/0205; F16B 7/10; F16B 7/105; F16B 7/042; B21D 39/04; B21D 39/046; B21D 39/048; A63B 2060/0085; A01B 1/022; A01B 1/22; A46B 7/046; A46B 2200/302; A46B 53/007; A46B 53/02; A46B 53/14; Y10T 16/473; Y10T 16/4719; Y10T 16/498; Y10T 16/4554; Y10T 403/32467; Y10T 403/598; Y10T 403/7079; Y10T 403/32475; Y10T 15/10
See application file for complete search history.

(56) References Cited

U.S. PATENT DOCUMENTS

| 1,450,322 | A |   | 4/1923  | McElhany |              |
|-----------|---|---|---------|----------|--------------|
| 2,545,813 | A | * | 3/1951  | Jackson  | A61G 1/048   |
|           |   |   |         |          | 403/325      |
| 5,288,161 | A | * | 2/1994  | Graves   | B05C 17/0205 |
|           |   |   |         |          | 15/145       |
| 5,339,916 | A | * | 8/1994  | Louis    | A47L 5/28    |
|           |   |   |         |          | 15/340.2     |
| 5,682,641 | A | * | 11/1997 | Newman, Jr. | B05C 17/0205 |
|           |   |   |         |          | 15/144.4     |
| 5,692,782 | A | * | 12/1997 | Fischer  | A47L 9/244   |
|           |   |   |         |          | 285/24       |
| 5,729,865 | A | * | 3/1998  | Stoddart | B05C 17/0205 |
|           |   |   |         |          | 16/429       |
| 5,983,455 | A | * | 11/1999 | Polzin   | B05C 17/0205 |
|           |   |   |         |          | 15/144.4     |

(Continued)

FOREIGN PATENT DOCUMENTS

| DE | 2637561 A1 | * | 2/1978  | ............... F16B 7/105 |
| GB | 2370802 A  | * | 7/2002  | ............... B25G 1/04  |
| JP | 3171671 U  | * | 11/2011 |                            |

Primary Examiner — Chuck Y Mah
(74) Attorney, Agent, or Firm — Cook Alex Ltd.

(57) ABSTRACT

A locking hub and extensible handle assembly includes a handle having an elongated portion with a stop member at a first end, a grasping portion at an opposed second end, and at least one push button within the handle and proximate the first end. The assembly further includes a hub having a body with a passage extending through the body in a longitudinal direction and slidably receiving the elongated portion of the handle. The assembly also includes an actuator that is movable to permit the push button to be used to lock and unlock the handle relative to the hub.

20 Claims, 11 Drawing Sheets

(56) References Cited

U.S. PATENT DOCUMENTS

| | | | | |
|---|---|---|---|---|
| 6,408,560 B1* | 6/2002 | Bloom | ............... | A01K 77/00 403/109.3 |
| 6,435,754 B1* | 8/2002 | Canale | ............... | F16L 27/1273 403/109.2 |
| 6,454,233 B1* | 9/2002 | Adams | ............... | A01K 77/00 248/291.1 |
| 6,474,696 B1* | 11/2002 | Canale | ............... | A47L 9/244 285/7 |
| 6,565,123 B2* | 5/2003 | Schiemann | ............... | A47L 9/244 285/7 |
| 6,832,784 B1* | 12/2004 | Chen | ............... | A47L 9/244 285/303 |
| 6,854,916 B2* | 2/2005 | Hsieh | ............... | F16B 7/105 403/109.1 |
| 7,004,671 B2* | 2/2006 | Tawara | ............... | A47L 9/242 15/143.1 |
| 7,025,383 B2* | 4/2006 | Canale | ............... | A47L 9/244 285/302 |
| 7,124,533 B2 | 10/2006 | Kleckner | | |
| 7,681,285 B2* | 3/2010 | Hua | ............... | B25G 3/26 16/422 |
| 7,774,901 B1* | 8/2010 | Huang | ............... | B25G 1/04 16/113.1 |
| 7,891,132 B2* | 2/2011 | Hetzner | ............... | A01K 77/00 210/238 |
| 8,261,482 B1* | 9/2012 | Buchanan | ............... | A01K 77/00 206/223 |
| 9,205,549 B1* | 12/2015 | Lin | ............... | B25G 1/04 |
| 2001/0047570 A1* | 12/2001 | Lanz | ............... | B25G 3/26 16/429 |
| 2015/0089821 A1* | 4/2015 | Troudt | ............... | B25G 3/18 30/519 |
| 2018/0009099 A1* | 1/2018 | Resh | ............... | B25G 3/18 |

\* cited by examiner

LOCKING HUB AND EXTENSIBLE HANDLE ASSEMBLY

BACKGROUND OF THE INVENTION

Field of the Invention

The present invention generally relates to extensible handles, such as may be used in a fish landing net, and more particularly for devices having a handle and hub assembly wherein the handle can be moved relative to the hub from a retracted position to an extended position.

Discussion of the Prior Art

There are a variety of devices that use an extensible handle, such as a landing net that may be used to transfer a hooked fish from a fishing line to a bucket, a boat, or back to the water being fished. Use of a push button connection between a handle and hub is known, but may require a user to specifically depress the push button with a finger, which may not be convenient when hands are gloved, wet or the device is moving, such as when a fish may be moving within a net. Known assembly connections using a push button also may have a fairly short overlap between the handle and a hub to which the handle is connected. This may result in a connection that does not feel firm or secure.

SUMMARY OF THE INVENTION

The purpose and advantages of the invention will be set forth in and apparent from the description and drawings that follow, as well as will be learned by practice of the claimed subject matter.

This disclosure generally provides a locking hub and extensible handle assembly that may be used on devices for which it is advantageous to be able to extend a handle from a retracted position for storage or transport, to an extended position for use. As a further advantage, the handle itself may be telescopic, so as to provide greater reach for the device. In addition, it is preferable to be able to affect locking and unlocking of the handle position relative to a hub using a relatively simple motor skill, such as by squeezing with a hand, regardless of whether or not the hand is gloved. It also is advantageous for the locking hub and extensible handle assembly to have a sliding relationship, for ease of use, while also having a significant overlap and optionally more than one locking element, for a more sturdy construction.

While the disclosure illustrates the invention in the context of an example landing net device for use in fishing, it will be appreciated that the locking hub and extensible handle assembly may be adapted for use with various devices that have an elongated handle and which may benefit from being able to quickly and conveniently move the handle portion between a retracted position and a secure extended position.

In a first aspect, this disclosure provides a locking hub and extensible handle assembly that includes a handle having an elongated portion with a stop member at a first end, a grasping portion at an opposed second end, and at least one push button within the handle and proximate the first end. The at least one push button is biased to extend outward from an opening in the elongated portion of the handle and is depressible to a retracted position substantially within the handle. The assembly includes a hub having a body having a passage extending through the body in a longitudinal direction, with the passage slidably receiving the elongated portion of the handle, and the body having at least one aperture that extends through a sidewall of the body perpendicular to and in communication with the passage. Also included in the assembly is an actuator having a base that is movably connected to and extending in the longitudinal direction along at least a portion of the sidewall of the body, and having at least one post that extends into the at least one aperture that extends through the sidewall of the body. The actuator is biased to a first position wherein the at least one post is in a retracted position within the aperture of the body, and the aperture receives the at least one push button that is biased to extend outward from the handle, and the elongated portion of the handle is locked in an extended position relative to the hub. The actuator further has a second position wherein the actuator is depressed toward the sidewall of the body and the at least one post of the actuator has depressed the at least one push button to the retracted position substantially within the handle, and the elongated portion of the handle is unlocked and slidable within the passage extending through the body of the hub.

In the context of this disclosure, it will be appreciated that the term "handle" as used throughout this disclosure also may refer to a pole or other elongated tubular structure, whether of a single section or having multiple telescopically connected sections. It also will be appreciated that such pole or tubular structure may be configured to have any one of a variety of cross-sectional shapes, for instance, cylindrical, oval, square, rectangle or another suitable shape, and the passage through the body of the hub may have a corresponding cross-sectional shape.

It is to be understood that both the foregoing general description and the following detailed description are exemplary and provided for purposes of explanation only, and are not restrictive of the subject matter claimed. Further features and objects of the present disclosure will become more fully apparent in the following description of the preferred embodiments and from the appended claims.

BRIEF DESCRIPTION OF THE DRAWINGS

In describing the preferred embodiments, reference is made to the accompanying drawing figures wherein like parts have like reference numerals, and wherein.

It should be understood that the figures are not to scale. While some mechanical details of example locking hub and extensible handle, including additional plan and section views of the example shown and of examples that may have alternative configurations have not been included, such details are considered well within the comprehension of those of skill in the art in light of the present disclosure. It also should be understood that the present invention is not limited to the example embodiment illustrated.

DETAILED DESCRIPTION OF THE PREFERRED EMBODIMENT

For the following defined terms, these definitions shall be applied, unless a different definition is given in the claims or elsewhere in this disclosure. As used in this disclosure and the appended claims, the singular forms "a", "an", and "the" include plural referents unless the content clearly dictates otherwise. As used in this disclosure and the appended claims, the term "or" is generally employed in its sense including "and/or" unless the content clearly dictates otherwise.

Referring generally to FIGS. 1-15, it will be appreciated that locking hub and extensible handle devices of the present disclosure generally may be embodied within numerous configurations, and may be used in various devices, such as for example, fish landing nets. Indeed, while acknowledging that all of the example configurations of locking hub and extensible handle assemblies need not be shown herein, an example is provided to better demonstrate that aspects of the invention and that a variety of configurations and methods of use are contemplated.

Figure 14:
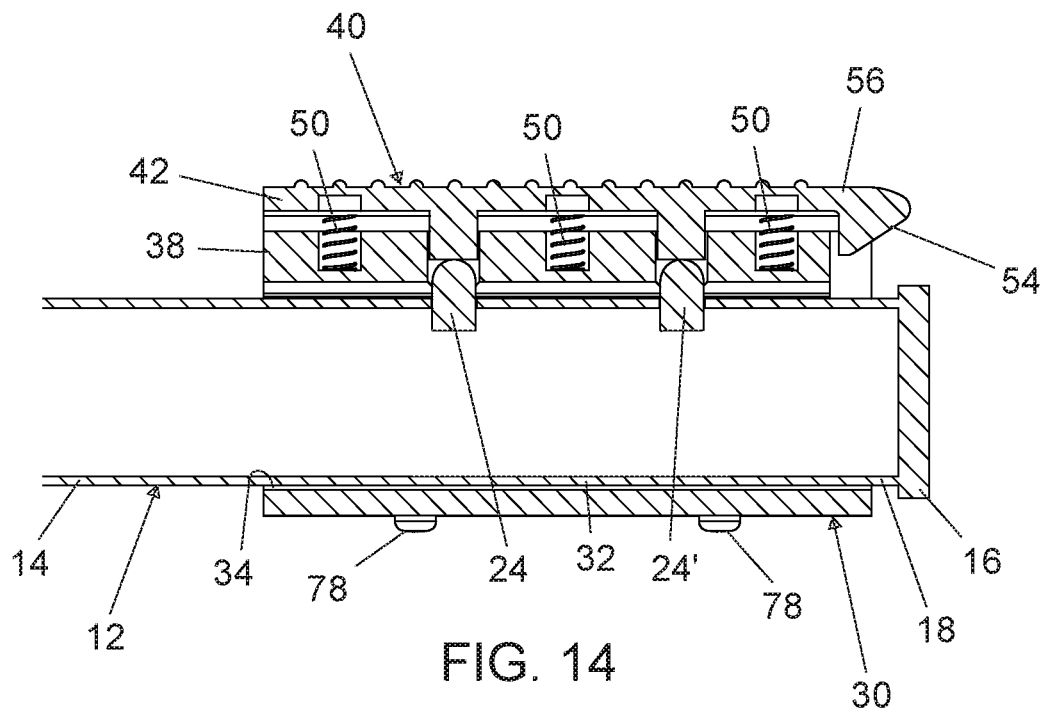
FIG. 14 is a longitudinal vertical cross-section view of the handle and hub of FIG. 1 shown in a further longitudinally advanced position, with the actuator in the first position biased away from the body and the two push buttons (shown in a simplified manner for convenience) received in apertures of the body, locking the position of the handle relative to the hub.
Figure 15:
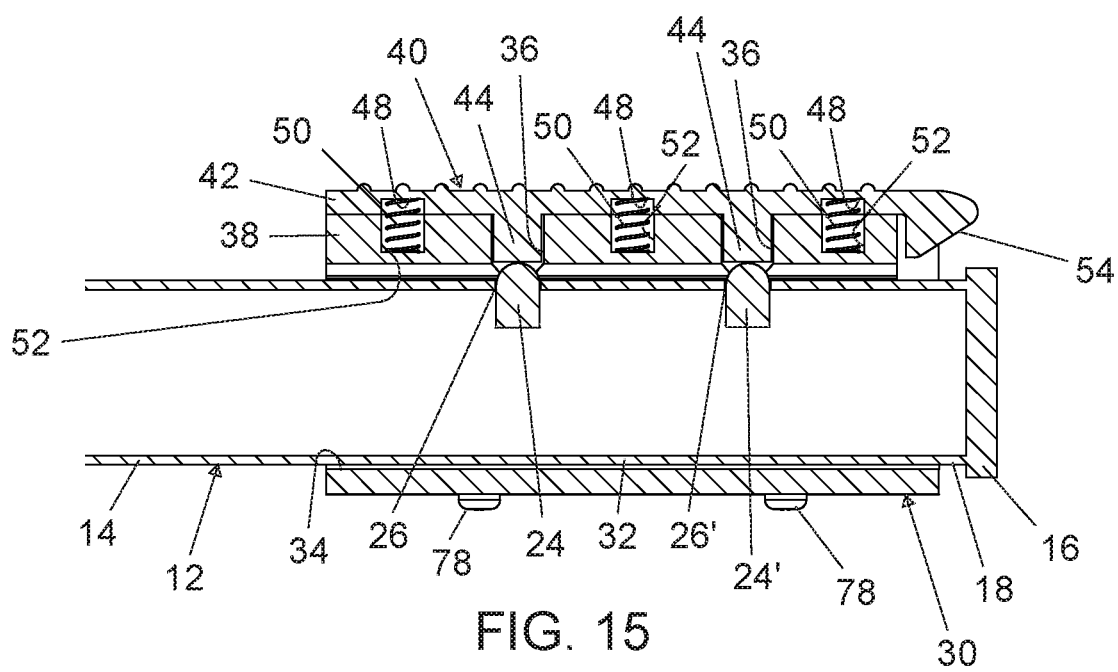
FIG. 15 is a longitudinal vertical cross-section view of the handle and hub of FIG. 1 and in the same longitudinal position as in FIG. 14, but with the actuator in the second position, depressed toward the body of the hub, so as to depress the two push buttons (shown in a simplified manner for convenience) into the handle to unlock the position of the handle relative to the hub.

The drawing figures illustrate an example embodiment of a locking hub and extensible handle assembly 10 that includes a handle 12 having an elongated portion 14 with a stop member 16 at a first end 18, a grasping portion 20 at an opposed second end 22, and at least one push button 24 within the handle 12 and proximate the first end 18. As may be seen in FIG. 13, the at least one push button 24 is biased to extend outward from an opening 26 in the elongated portion 14 of the handle 12 by a bent spring portion, although it will be appreciated that other suitable configurations may be used, and the at least one push button is shown in FIGS. 14 and 15 without the spring portion, for convenience. As may be seen in FIG. 15, and as will be appreciated throughout the figures, the at least one push button 24 is depressible to a retracted position substantially within the handle 12.

The assembly 10 includes a hub 30 having a body 32 having a passage 34 extending through the body 32 in a longitudinal direction, with the passage 34 slidably receiving the elongated portion 14 of the handle 12, and the body 32 having at least one aperture 36 that extends through a sidewall 38 of the body 32 perpendicular to and in communication with the passage 34.

Also included in the assembly 10 is an actuator 40 having a base 42 that is movably connected to and extending in the longitudinal direction along at least a portion of the sidewall 38 of the body 32, and having at least one post 44 that extends into the at least one aperture 36 that extends through the sidewall 38 of the body 32. The actuator 40 is biased to a first position wherein the at least one post 44 is in a retracted position within the aperture 36 of the body 32, as may be seen in FIGS. 11 and 14, and the aperture 36 receives the at least one push button 24 that is biased to extend outward from the handle 12, and the elongated portion 14 of the handle 12 is locked in an extended position relative to the hub 30, as may be seen in FIG. 14. The actuator 40 further has a second position wherein the actuator 40 is depressed toward the sidewall 38 of the body 32 and the at least one post 44 of the actuator 40 has depressed the at least one push button 24 to the retracted position substantially within the handle 12, as may be seen in FIG. 15, and the elongated portion 14 of the handle 12 is unlocked and slidable within the passage 34 extending through the body 32 of the hub 30.

Figure 1:
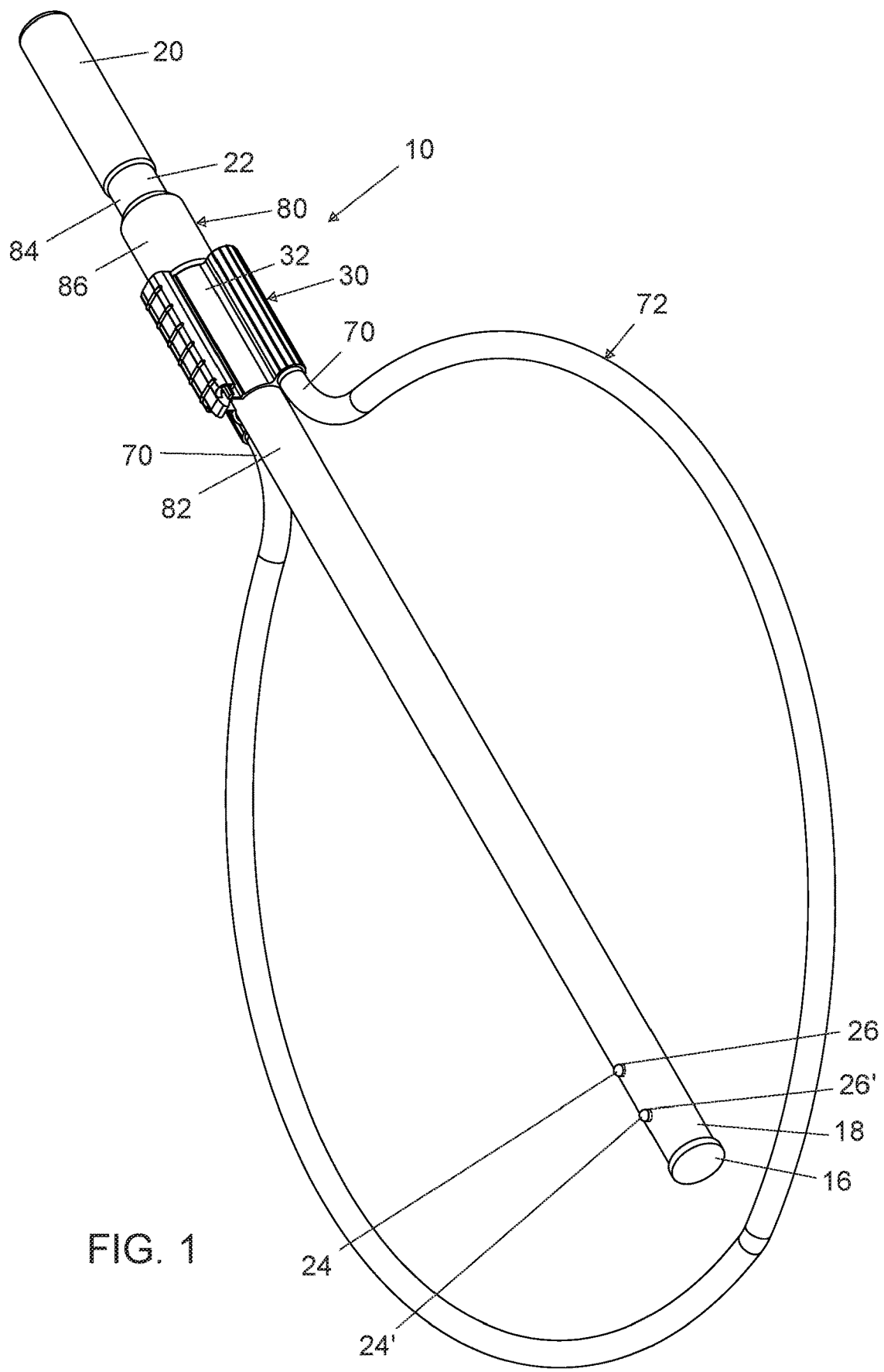
FIG. 1 is a perspective view of an example locking hub and extensible handle assembly incorporated into a fish landing net device, with the handle in a retracted position relative to the hub.

As may be appreciated for example when viewing FIGS. 1 and 14, the stop member 16 extends outward from the first end 18 of the elongated portion 14 of the handle 12 and would prevent the first end 18 of the elongated portion 14 of the handle 12 from passing through the passage 34 in the body 32 of the hub 30.

Figure 9:
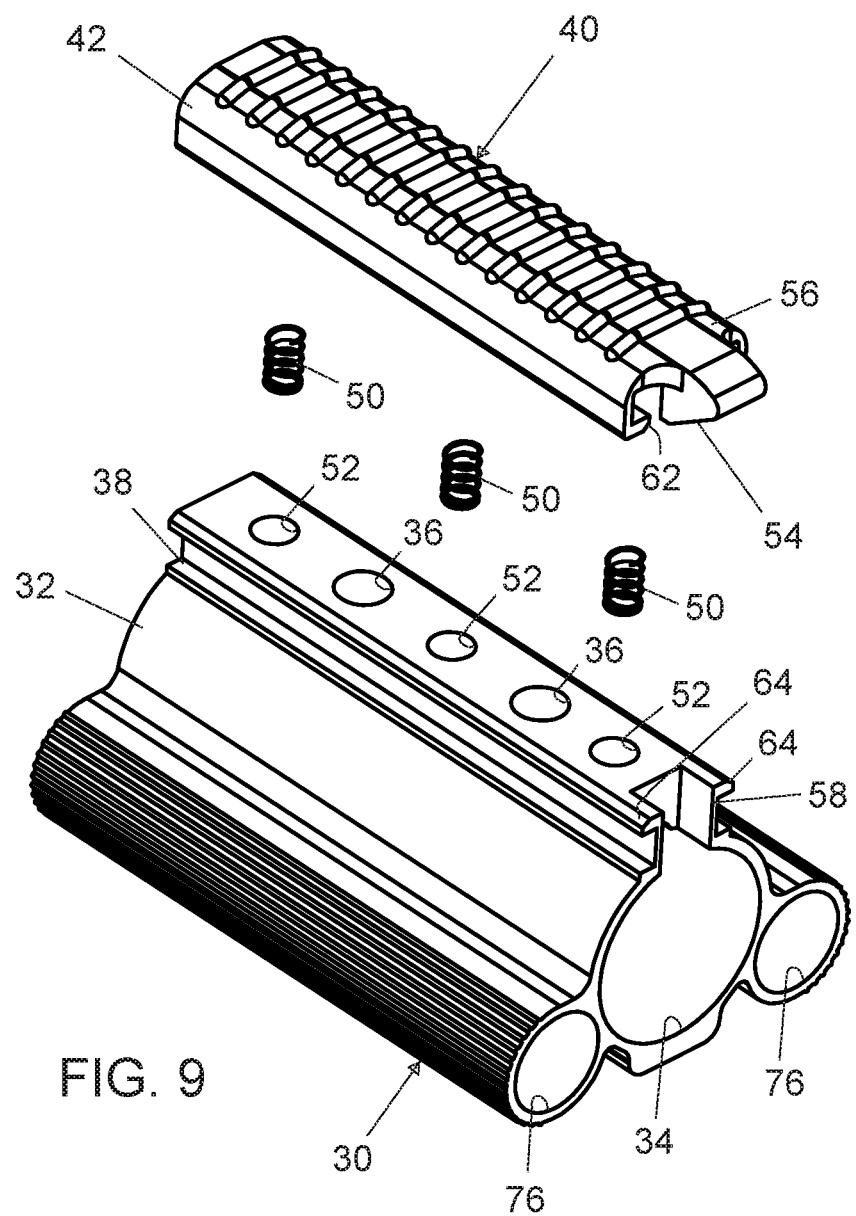
FIG. 9 is a closer upper perspective exploded view of the hub of the example device of FIG. 1, showing the actuator, resilient elements and the body of the hub.
Figure 10:
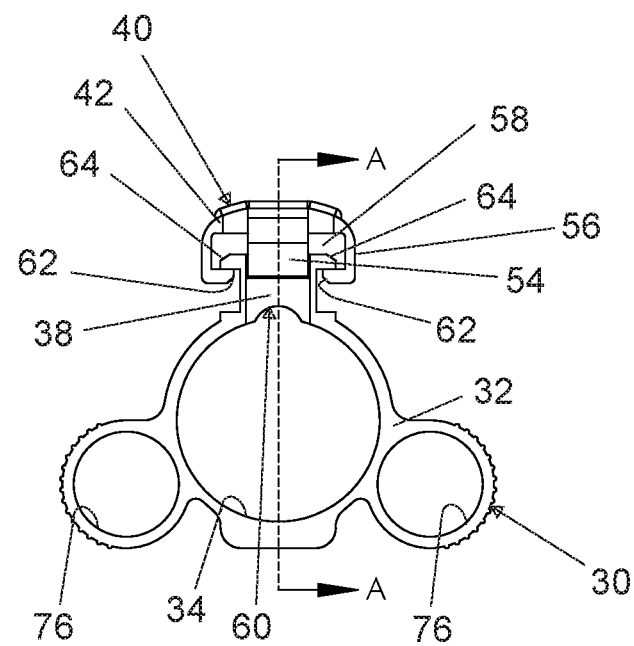
FIG. 10 is a front end view of the hub shown in FIG. 7, with a vertical cross-section line.
Figure 11:
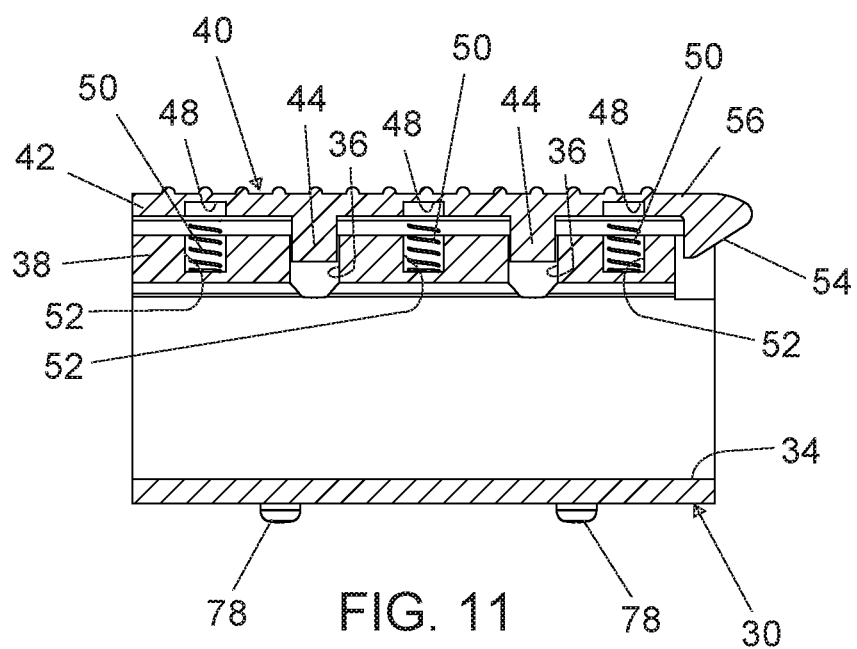
FIG. 11 is a vertical, longitudinal cross-section view of the hub shown in FIGS. 7-10, with the actuator in a first position biased away from the body.
Figure 12:
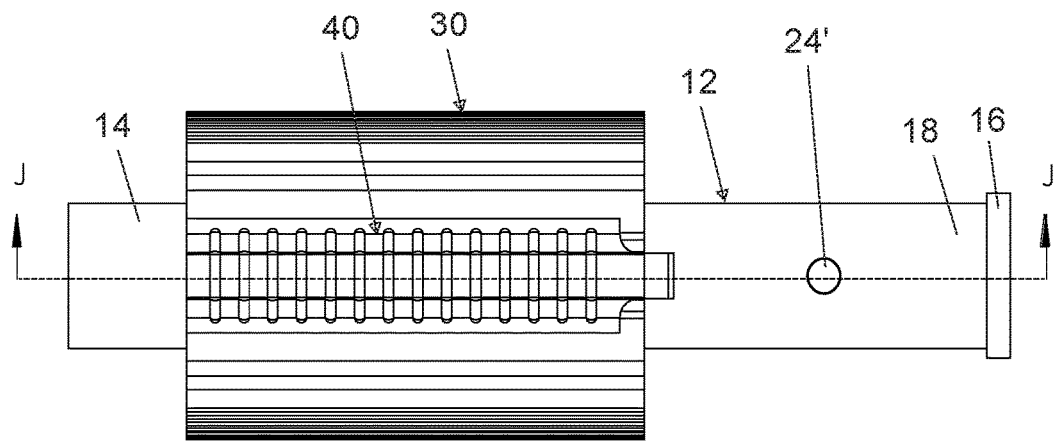
FIG. 12 is a top view of the hub, actuator and handle of the example device of FIG. 1, with the actuator in a second position, depressed toward the body of the hub, and a first of two push buttons engaging the ramped portion of the actuator to be depressed as the handle is being slidably advanced through a passage in the hub, and with a vertical longitudinal cross-section line through the assembly.

As may be appreciated in FIGS. 9, 11 and 14, the actuator 40 is biased to the first position extended outward from the body 32 of the hub 30 by at least one resilient element 50 disposed between the actuator 40 and the body 32 of the hub 30. An underside 46 of the actuator 40 includes a recess 48 and the sidewall 38 of the body 32 includes an opposed recess 52. Opposed ends of the at least one resilient element 50 are disposed between the actuator 40 and the body 32 of the hub 30 and are located within the respective opposed recesses 48 in the actuator and the recess 52 in the body 32. The at least one resilient element 50 may include at least two resilient elements 50 disposed between the actuator 40 and the body 32 of the hub 30, and more specifically, as shown for example in FIGS. 9 and 11, the at least one resilient element 50 may include three coiled springs disposed between the actuator 40 and the body 32 of the hub 30.

Figure 13:
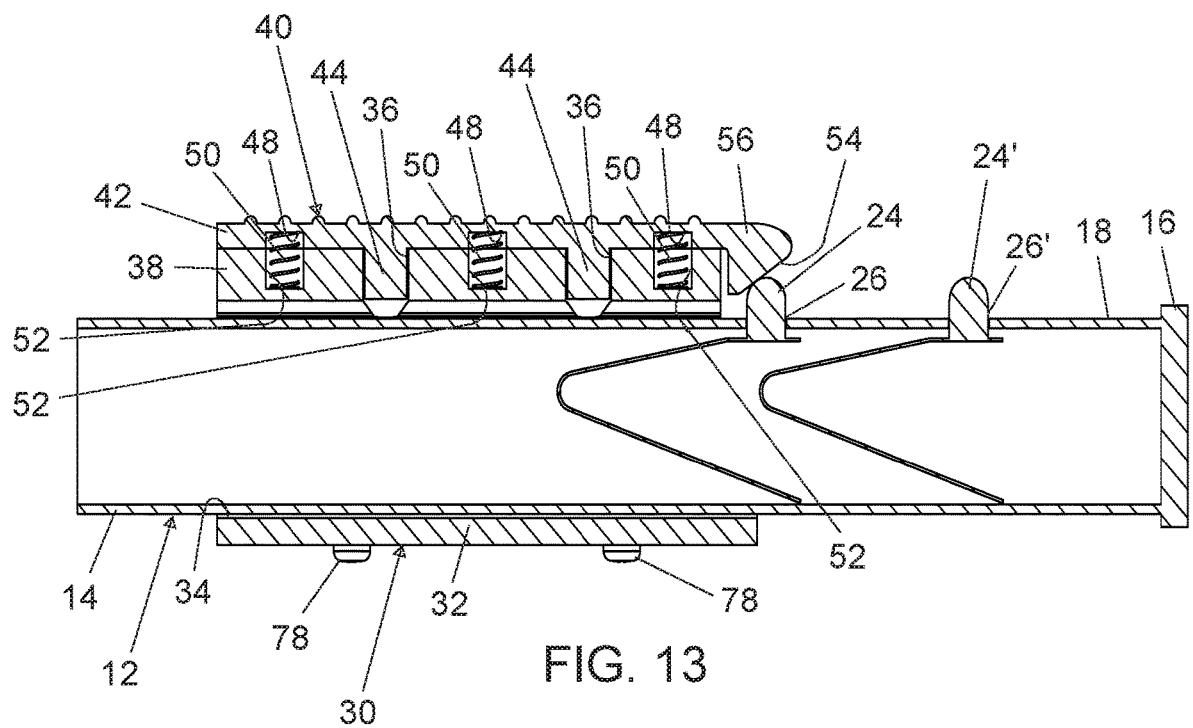
FIG. 13 is a longitudinal vertical cross-section view of the handle and hub of FIG. 1, with the actuator in a second position, depressed toward the body of the hub, and a first of two push buttons (shown in a simplified manner for convenience) in the handle is being depressed by a ramped portion of the actuator as the handle is being slidably advanced through a passage in the hub.

As may be seen in FIG. 13, the actuator 40 further includes a ramped portion 54 extending from a first end 56 of the base 42 of the actuator 40 toward the passage 34 through the body 32, and when the actuator 40 is depressed toward the sidewall 38 of the body 32, the ramped portion 54 is positioned adjacent the passage 34 through the body 32 of the hub 30. When the actuator 40 is depressed toward the sidewall 38 of the body 32 and the first end 18 of the elongated portion 14 of the handle 12 slides toward the body 32 of the hub 30, the ramped portion 54 engages and guides the at least one push button 24 to the depressed, retracted position within the elongated portion 14 of the handle 12 so as to enter the passage 34 through the body 32. This permits the handle 12 to slide within the passage 34 of the hub 30. When the at least one push button 24 is aligned with the aperture 36 in the body 32 and the actuator 40 is released, the at least one push button 24 is biased outward and received by the aperture 36 so as to lock the elongated portion 14 of the handle 12 relative to the body 32 of the hub 30. Thus, when the user no longer depresses the actuator 40 toward the hub 30, the at least one resilient member 50 forces the actuator 40 to be biased away from the body 32 of the hub 30, partially withdrawing the at least one post 44, thereby permitting the at least one push button 24 to move into the aperture 36 to lock the handle 12 in an extended position relative to the hub 30.

The sidewall 38 of the body 32 that includes the aperture 36 further includes a T-shaped rib 58, and the base 42 of the actuator comprises a C-shaped channel 60 that captures the T-shaped rib 58, with the actuator 40 being movable between the actuator first position (biased outward from the body) and second position (depressed toward the body).

The C-shaped channel 60 of the actuator 40 includes an entry having angled surfaces 62, the T-shaped rib 58 of the body 32 includes outward facing angled surfaces 64 that are opposed and complementary to the angled surfaces 62 at the entry of the C-shaped channel 60. The C-shaped channel 60 of the actuator 40 is assembled to the T-shaped rib 58 of the body 32 by forcing the actuator 40 toward the body 32 until the complementary angled surfaces 62 of the C-shaped channel 60 slide over the angled surfaces 64 of the T-shaped rib 58 and the T-shaped rib 58 enters the C-shaped channel 60. This results in the actuator 40 being movably connected to the hub 30.

Figure 4:
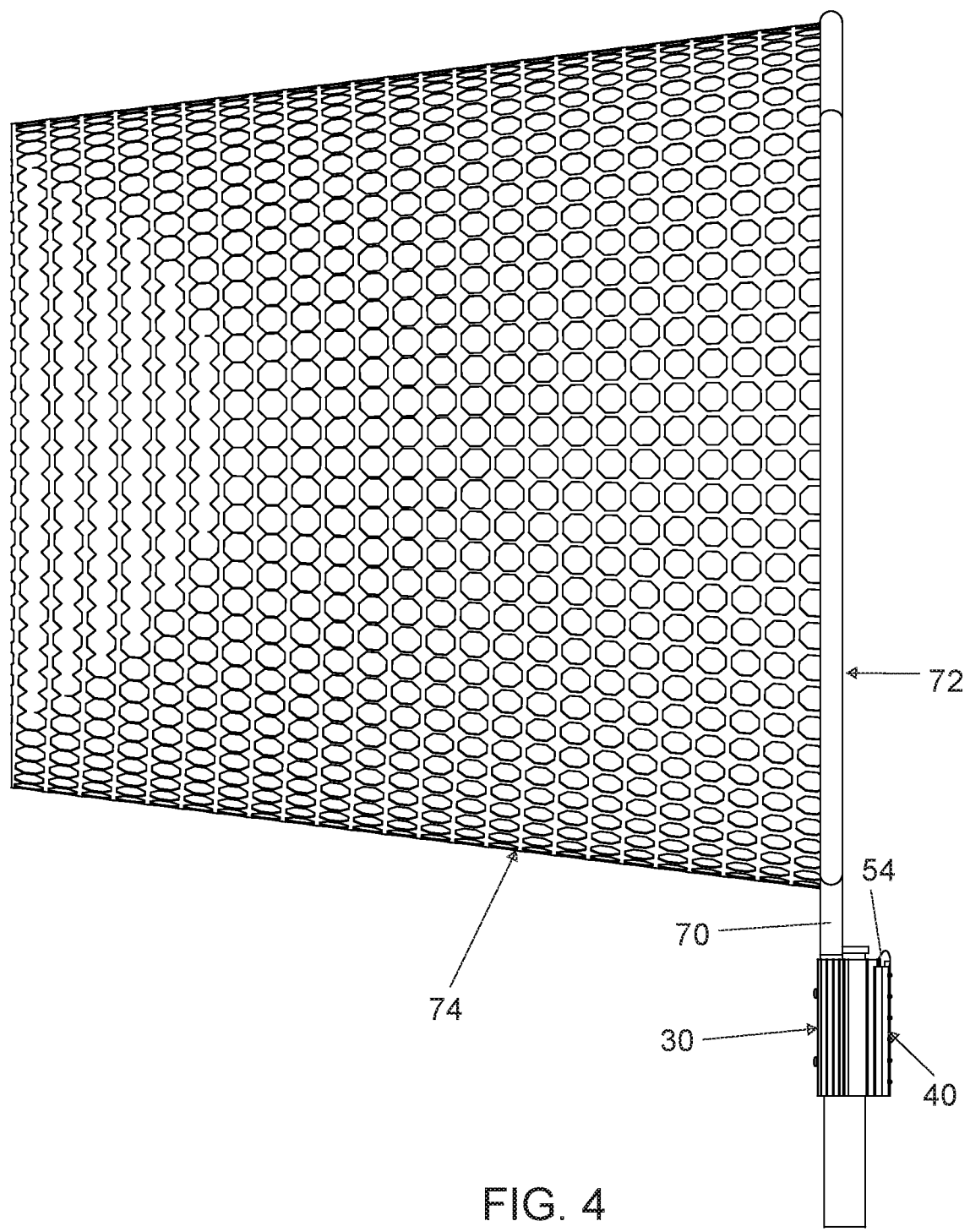
FIG. 4 is a side view of a portion of the example device of FIG. 1, showing a hoop-shaped elongated member connected to the hub.
Figure 5:
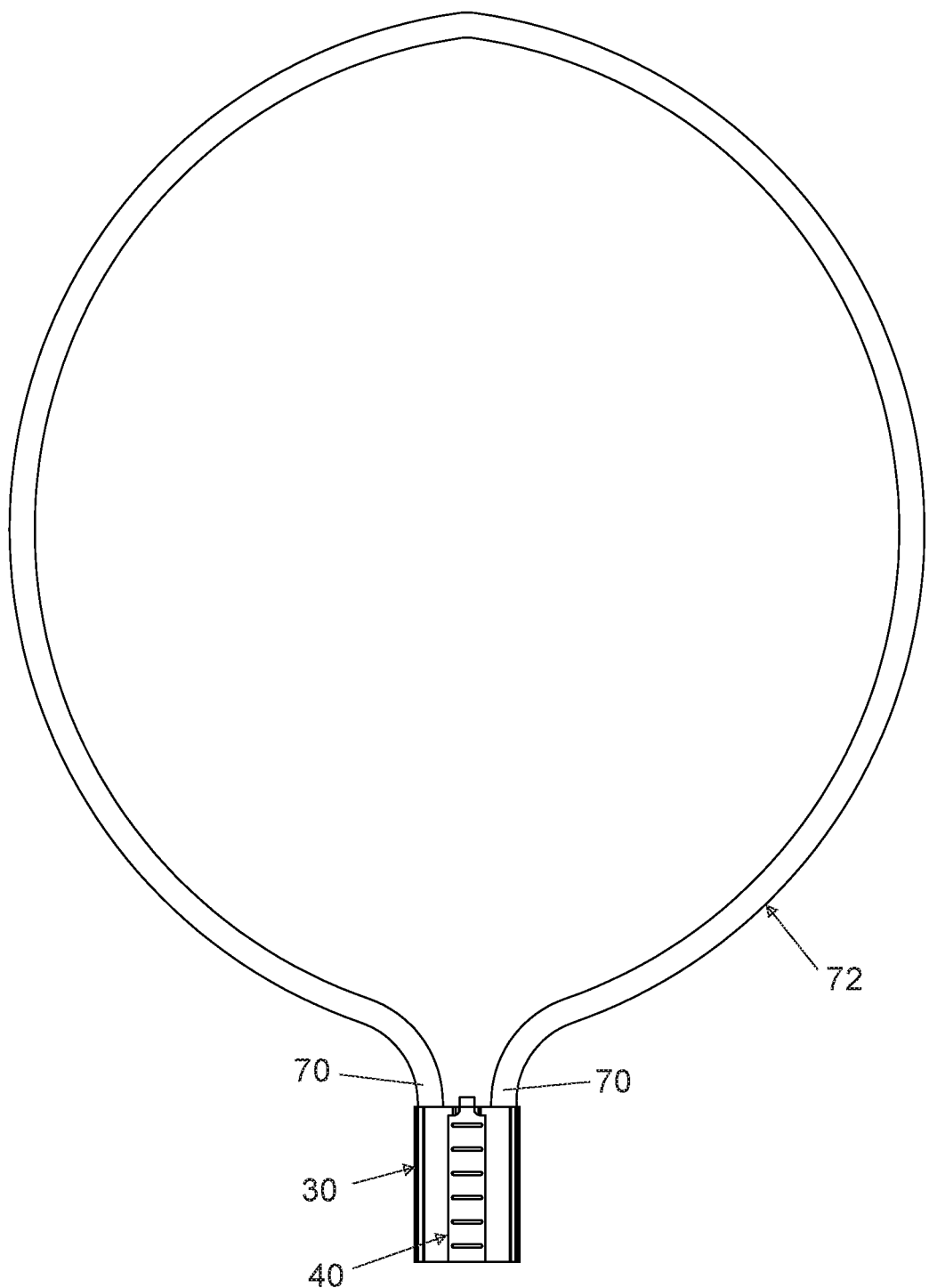
FIG. 5 is a top view of the portion of the example shown in FIG. 4.
Figure 6:
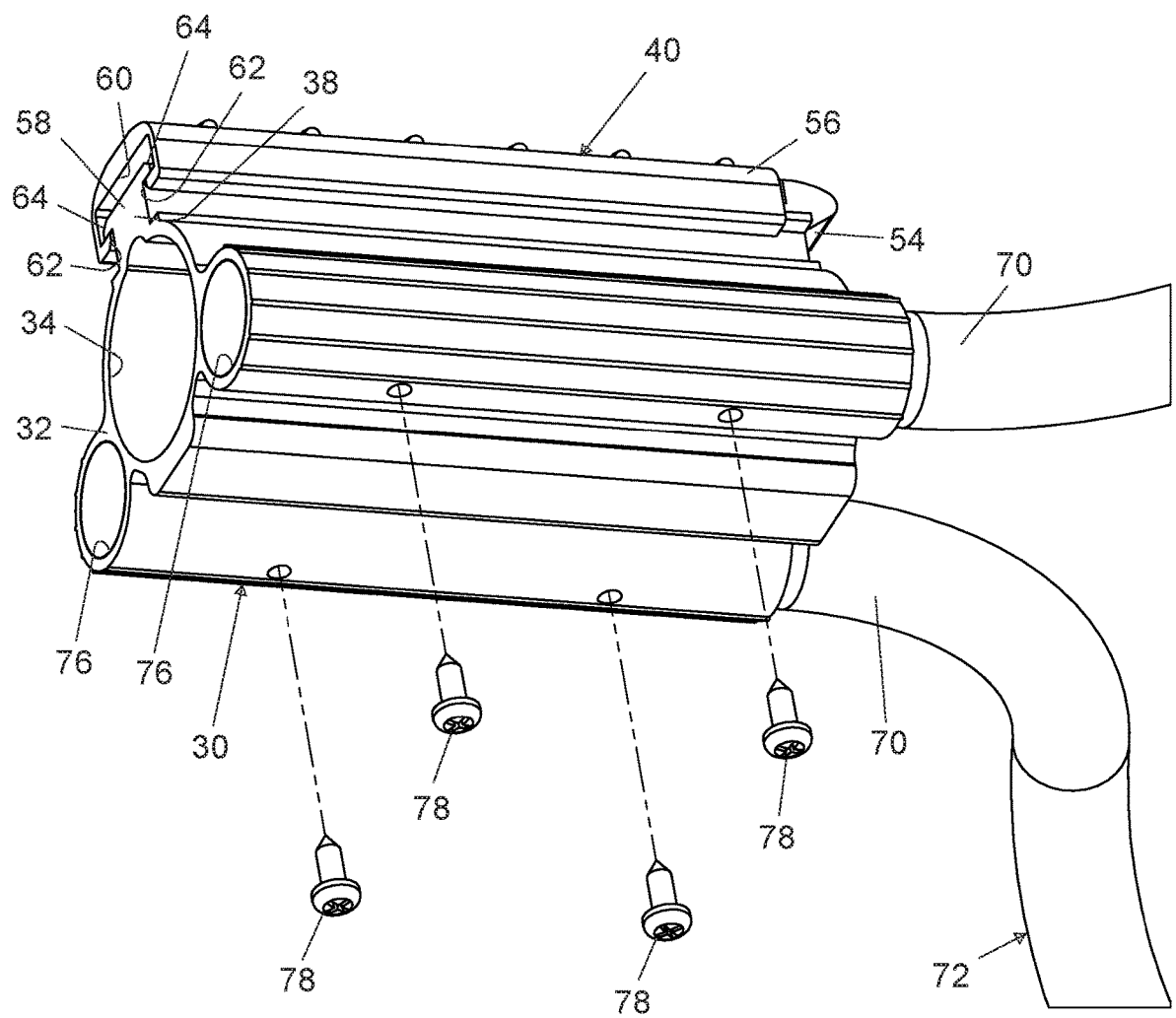
FIG. 6 is a lower perspective view of the connection of the hoop shaped elongated member to the hub of the example shown in FIG. 4.
Figure 7:
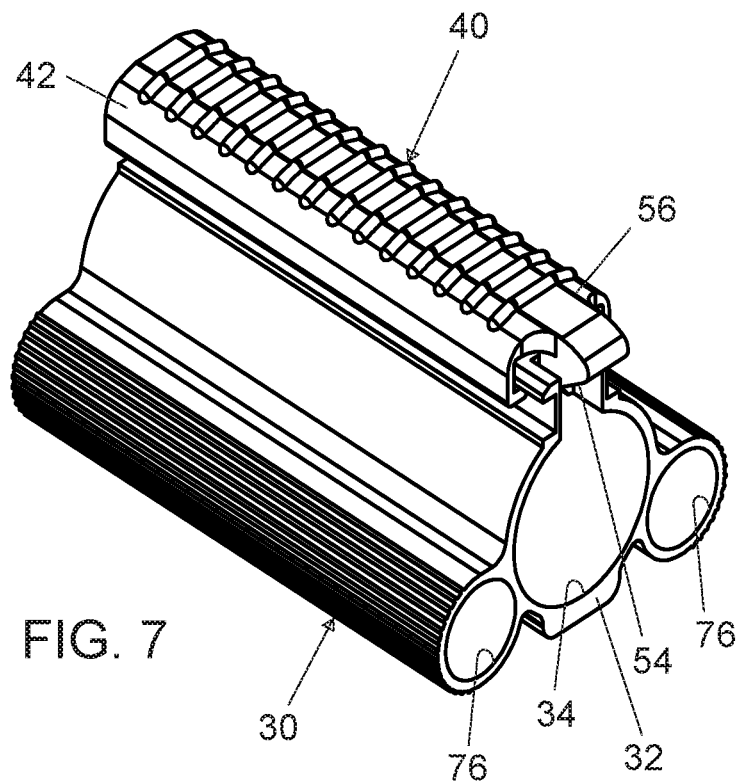
FIG. 7 is a closer upper perspective view of the hub of the example device of FIG. 1, showing an actuator connected to a body of the hub.
Figure 8:
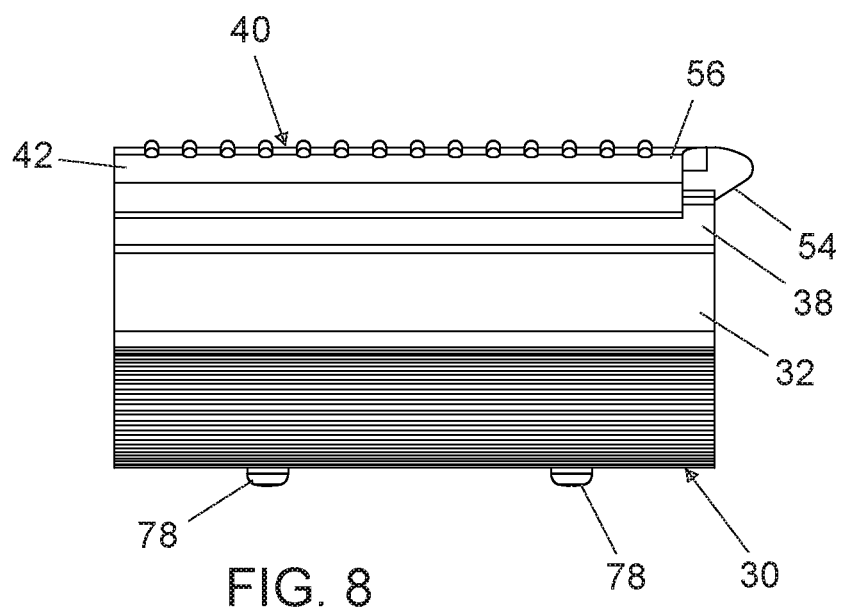
FIG. 8 is a side view of the hub shown in FIG. 7.

As may be appreciated by FIGS. 1, 4 and 6, in the present example, two ends 70 of a hoop-shaped elongated member 72 are connected to the hub 30. Indeed, the present example utilizes the locking hub and extensible handle assembly 10 within an example of a fish landing net having netting 74, as seen for example in FIG. 4, connected to the hoop-shaped elongated member 72. The body 32 of the hub 30 further comprises a yoke having two cavities 76 that respectively receive the two ends 70 of the hoop-shaped elongated member 72. The two ends 70 of the hoop-shaped elongated member 72 are removably connected to the yoke by fasteners 78, which are shown in this example in FIG. 6 as removable screws, but alternatively may be rivets, adhesive or other suitable means of fastening.

As seen in this example, the handle 12 may further include at least a second push button 24' within the handle 12 proximate the first end 18 and being biased to extend outward from the elongated portion 14 of the handle 12 and is depressible to a retracted position substantially within the handle 12. The second push button 24' may be constructed similarly to the first push button 24. In turn, the body 32 further includes at least a second aperture 36 that extends through the sidewall 38 of the body 32 perpendicular to and in communication with the passage 34, and the actuator 40 further includes at least a second post 44 that extends into the at least second aperture 36 that extends through the sidewall 38 of the body 32. It will be appreciate that the at least one push button 24 may be received in either aperture 36 to lock the position of hub 30 to the handle 12 in an extended position of the handle. In addition, it further will be appreciated that receipt of the push buttons 24, 24' in the respective apertures 36, 36, result in a more robust releasable connection of the handle 12 to the hub 30 and hoop-shaped elongated member 72.

Figure 2:
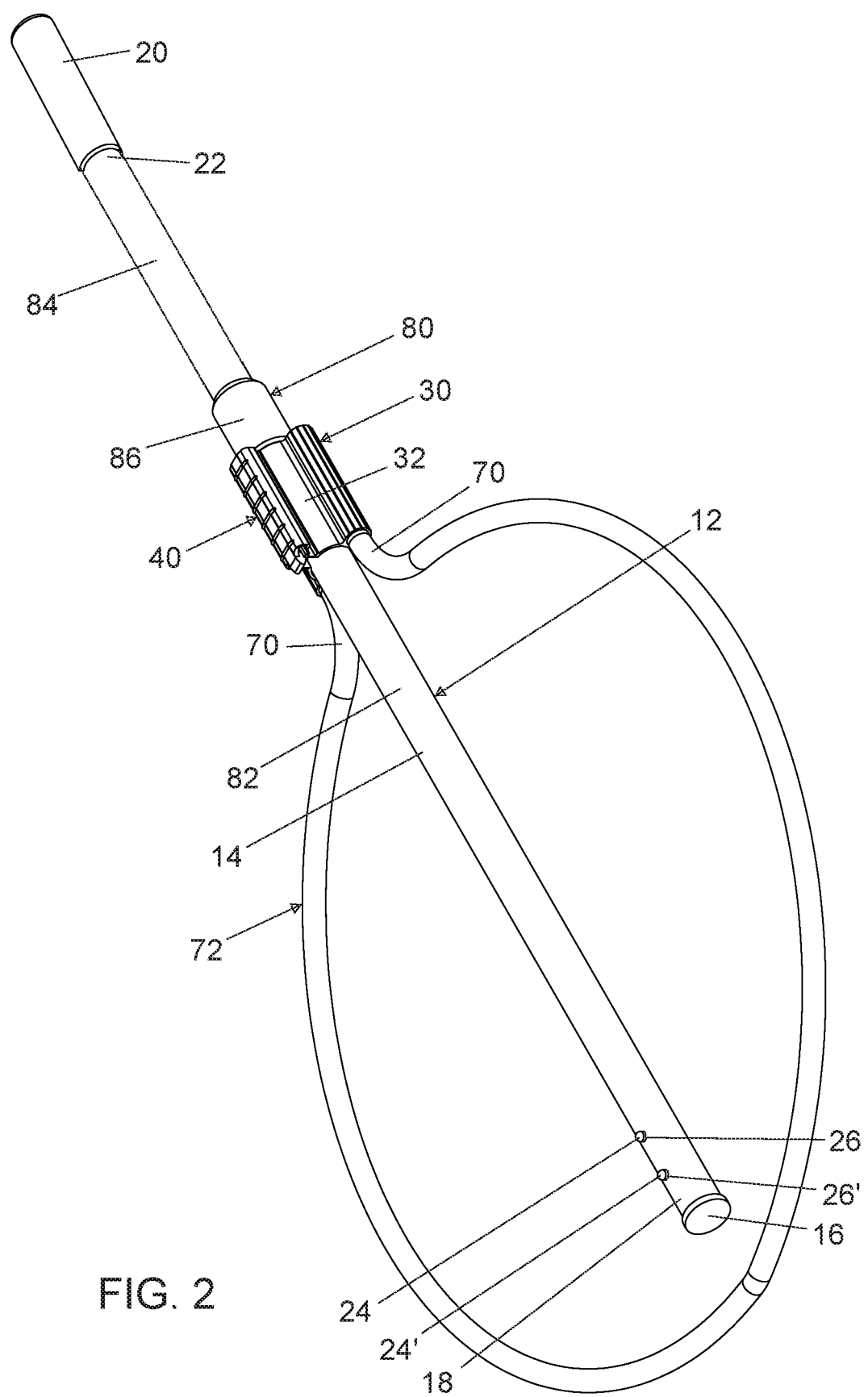
FIG. 2 is a perspective view of the example device of FIG. 1, but showing the telescopic assembly of the handle partially extended.
Figure 3:
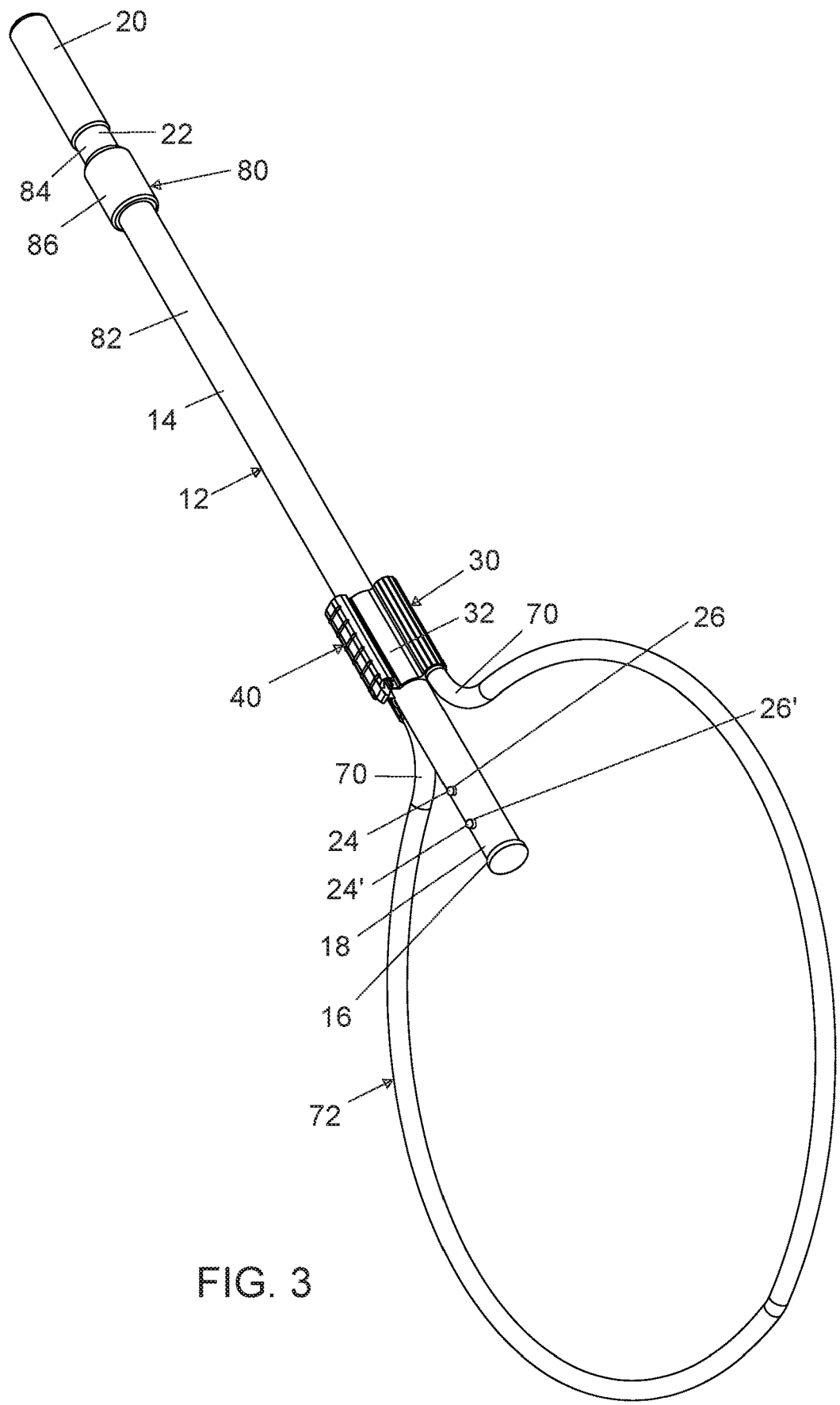
FIG. 3 is a perspective view of the example device of FIG. 1, showing the handle in an extended position relative to the hub.

To provide additional reach, the elongated portion 14 of the handle 12 may further include a telescoping assembly 80, as seen in FIGS. 1-3. In this example, the telescoping assembly 80 of the elongated portion 14 includes first and second sections 82, 84 and a locking twist collar 86 that releasably locks the extended position of the second section 84 of the elongated portion 14 relative to the first section 82 of the elongated portion 14. While the locking twist collar 86 may be rotated to releasably lock or unlock the first section 82 relative to the second section 84, it will be appreciated that alternative releasably locking mechanisms may be used to connect and lock respective telescopic sections, such as a push button or the like, and the handle 12 alternatively may be of fixed length or may include two or more telescoping sections. As such, depending on the configuration chosen, the locking hub and extensible handle assembly 10 may provide substantial reach, yet with a very compact configuration for storage and transport.

From the above disclosure, it will be apparent that locking hub and extensible handle assemblies that are constructed in accordance with this disclosure may include a number of structural aspects that provide numerous advantages. The example aspects of such devices shown herein may exhibit one or more of the above-referenced potential advantages, depending upon the specific design chosen.

It will be appreciated that a locking hub and extensible handle assembly may be incorporated into a fish landing net or other device in accordance with the present disclosure and may be provided in various configurations. Any variety of suitable materials of construction, configurations, shapes and sizes for the components and methods of connecting the components may be utilized to meet the particular needs and requirements of an end user. It is to be understood that the invention is not to be limited to the examples disclosed herein, but rather, is intended to cover various modifications and equivalent arrangements included within the spirit and scope of the appended claims. Thus, the description and drawings should be considered illustrative and not restrictive of the invention, which is limited only by the appended claims and their legal equivalents.

The invention claimed is:
1. A locking hub and extensible handle assembly, comprising:
   a handle;
   the handle comprising an elongated portion with a stop member at a first end, a grasping portion at an opposed second end, and at least one push button within the handle and proximate the first end;
   the at least one push button being biased to extend outward from an opening in the elongated portion of the handle and is depressible to a retracted position substantially within the handle;
   a hub;

the hub comprising a body having a passage extending through the body in a longitudinal direction, with the passage slidably receiving the elongated portion of the handle, and the body having at least one aperture that extends through a sidewall of the body perpendicular to and in communication with the passage;

an actuator comprising a base that is movably connected to and extending in the longitudinal direction along at least a portion of the sidewall of the body, and having at least one post that extends into the at least one aperture that extends through the sidewall of the body;

the actuator being biased to a first position wherein the at least one post is in a retracted position within the aperture of the body, and the aperture receives the at least one push button that is biased to extend outward from the handle, wherein the elongated portion of the handle is locked in an extended position relative to the hub; and the actuator further having a second position wherein the actuator is depressed toward the sidewall of the body and the at least one post of the actuator has depressed the at least one push button to the retracted position substantially within the handle, and wherein the elongated portion of the handle is unlocked and slidable within the passage extending through the body of the hub.

2. The locking hub and extensible handle assembly in accordance with claim 1, wherein the stop member extends outward from the first end of the elongated portion of the handle and prevents the first end of the elongated portion of the handle from passing through the passage in the body of the hub.

3. The locking hub and extensible handle assembly in accordance with claim 1, wherein the actuator is biased to the first position by at least one resilient element disposed between the actuator and the body of the hub.

4. The locking hub and extensible handle assembly in accordance with claim 3, wherein an underside of the actuator includes a recess and the sidewall of the body includes an opposed recess, and opposed ends of the at least one resilient element disposed between the actuator and the body of the hub are located within the respective opposed recess in the actuator and the recess in the body.

5. The locking hub and extensible handle assembly in accordance with claim 3, wherein the at least one resilient element further comprises at least two resilient elements disposed between the actuator and the body of the hub.

6. The locking hub and extensible handle assembly in accordance with claim 3, wherein the at least one resilient element further comprises three coiled springs disposed between the actuator and the body of the hub.

7. The locking hub and extensible handle assembly in accordance with claim 1, wherein the actuator further comprises a ramped portion extending from a first end of the base of the actuator toward the passage through the body, and when the actuator is depressed toward the sidewall of the body, the ramped portion is positioned adjacent the passage through the body of the hub.

8. The locking hub and extensible handle assembly in accordance with claim 7, wherein when the actuator is depressed toward the sidewall of the body and the first end of the elongated portion of the handle slides toward the body of the hub, the ramped portion engages and guides the at least one push button to the depressed, retracted position within the elongated portion of the handle so as to enter the passage through the body.

9. The locking hub and extensible handle assembly in accordance with claim 8, wherein when the at least one push button is aligned with the aperture in the body and the actuator is released, the at least one push button is biased outward and received by the aperture so as to lock the elongated portion of the handle relative to the body of the hub.

10. The locking hub and extensible handle assembly in accordance with claim 1, wherein the sidewall of the body that includes the aperture further includes a T-shaped rib, and the base of the actuator comprises a C-shaped channel that captures the T-shaped rib, with the actuator being movable between the actuator first position and second position.

11. The locking hub and extensible handle assembly in accordance with claim 10, wherein the C-shaped channel of the actuator includes an entry having angled surfaces, the T-shaped rib of the body includes outward facing angled surfaces that are opposed and complementary to the angled surfaces at the entry of the C-shaped channel.

12. The locking hub and extensible handle assembly in accordance with claim 11, wherein the C-shaped channel of the actuator is assembled to the T-shaped rib of the body by forcing the actuator toward the body until the complementary angled surfaces of the C-shaped channel slide over the angled surfaces of the T-shaped rib and the T-shaped rib enters the C-shaped channel.

13. The locking hub and extensible handle assembly in accordance with claim 1, wherein two ends of a hoop-shaped elongated member are connected to the hub.

14. The locking hub and extensible handle assembly in accordance with claim 13, wherein netting is connected to the hoop-shaped elongated member.

15. The locking hub and extensible handle assembly in accordance with claim 13, wherein the body of the hub further comprises a yoke having two cavities that respectively receive the two ends of the hoop-shaped elongated member.

16. The locking hub and extensible handle assembly in accordance with claim 15, wherein the two ends of the hoop-shaped elongated member are removably connected to the yoke by fasteners.

17. The locking hub and extensible handle assembly in accordance with claim 1, wherein the handle further comprises at least a second push button within the handle proximate the first end and being biased to extend outward from the elongated portion of the handle and is depressible to a retracted position substantially within the handle.

18. The locking hub and extensible handle assembly in accordance with claim 17, wherein the body further comprises at least a second aperture that extends through the sidewall of the body perpendicular to and in communication with the passage, and the actuator further comprises at least a second post that extends into the at least second aperture that extends through the sidewall of the body.

19. The locking hub and extensible handle assembly in accordance with claim 1, wherein the elongated portion of the handle further comprises a telescoping assembly.

20. The locking hub and extensible handle assembly in accordance with claim 1, wherein the telescoping assembly of the elongated portion includes first and second sections and a locking twist collar that releasably locks the position of the second section of the elongated portion relative to the first section of the elongated portion.

* * * * *